US009479612B2

(12) United States Patent
Bertsch et al.

(10) Patent No.: US 9,479,612 B2
(45) Date of Patent: Oct. 25, 2016

(54) REMOTE CONTROL FOR A DIAGNOSTIC DISPLAY MECHANISM VIA REMOTE DESKTOP CONNECTIONS

(71) Applicant: SIEMENS AKTIENGESELLSCHAFT, Munich (DE)

(72) Inventors: Rüdiger Bertsch, Erlangen (DE); Thomas Friese, Munich (DE); Vladyslav Ukis, Nuremberg (DE)

(73) Assignee: Siemens Aktiegesellschaft, Munich (DE)

( * ) Notice: Subject to any disclaimer, the term of this patent is extended or adjusted under 35 U.S.C. 154(b) by 423 days.

(21) Appl. No.: 13/768,273

(22) Filed: Feb. 15, 2013

(65) Prior Publication Data
US 2013/0268579 A1    Oct. 10, 2013

(30) Foreign Application Priority Data

Apr. 4, 2012  (EP) .................................... 12163090

(51) Int. Cl.
*G06F 15/16* (2006.01)
*H04L 29/06* (2006.01)
*H04L 29/08* (2006.01)

(52) U.S. Cl.
CPC ............... *H04L 67/42* (2013.01); *H04L 67/12* (2013.01); *H04L 67/125* (2013.01)

(58) Field of Classification Search
None
See application file for complete search history.

(56) References Cited

U.S. PATENT DOCUMENTS

| 6,597,934 | B1* | 7/2003 | de Jong et al. ............... 600/407 |
| 7,801,490 | B1* | 9/2010 | Scherzer .................... 455/67.13 |
| 2005/0238216 | A1* | 10/2005 | Yoden .......................... 382/128 |
| 2008/0244081 | A1 | 10/2008 | Elangovan |
| 2009/0129643 | A1* | 5/2009 | Natanzon et al. ............ 382/128 |
| 2009/0300167 | A1* | 12/2009 | Jones et al. .................... 709/224 |
| 2011/0219062 | A1* | 9/2011 | Allen et al. ................... 709/203 |

FOREIGN PATENT DOCUMENTS

WO    WO 2011127991 A1    10/2011

OTHER PUBLICATIONS

Teleradiology Changing Radiological Service Processes from Local to Regional, International and Mobile Environment, Jarmo Reponen; Jarmo Reponen, Teleradiology Changing Radiological Service Processes from Local to Regional, International and Mobile Environment, ACTA Universitatis Ouluensis, Finnland, Jan. 1, 2010, gefunden im Internet: URL:http://herkules.oulu.fi. isbn9789514263729/isbn9789514263729.pdf, pp. 1-120.

* cited by examiner

*Primary Examiner* — Aftab N. Khan
(74) *Attorney, Agent, or Firm* — Harness, Dickey & Pierce, P.L.C.

(57) ABSTRACT

A method and a system are disclosed for the remote control of a viewer via a remote application. Communication between the control application and the viewer, installed on a remote computer, takes place via an agent. The agent exchanges data with the viewer via two communication channels, an RDP connection and an RVIC channel. In an embodiment, each image in a sequence of images to be displayed is identified by an identifier and assigned to a transmission indicator. The transmission indicator indicates how the image is to be transmitted (lossless or lossy). The agent then generates a modified dedicated sequence of images, which is transmitted to the viewer. The viewer is then able to check the reliability of the received modified sequence of images.

14 Claims, 2 Drawing Sheets

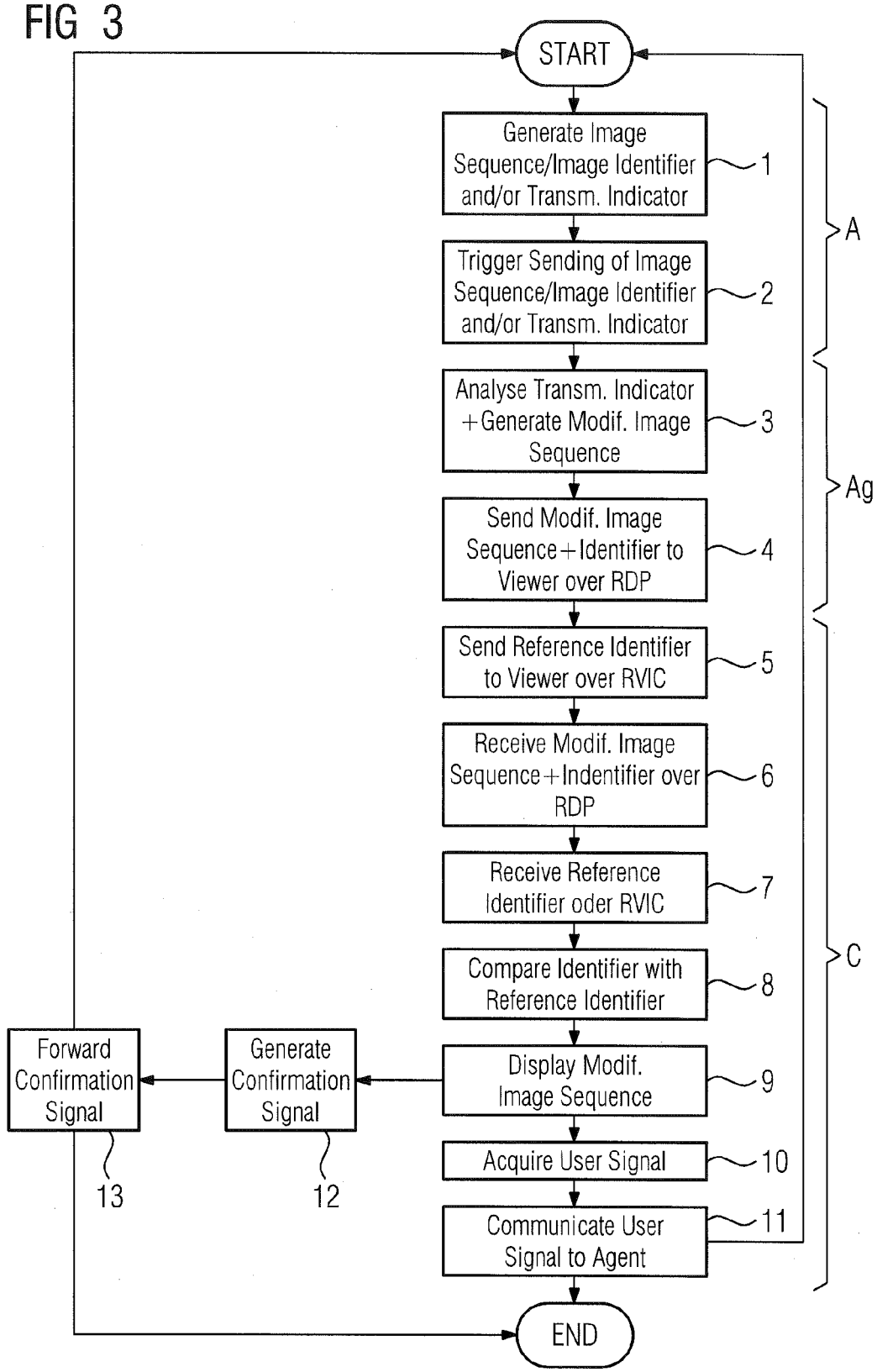

REMOTE CONTROL FOR A DIAGNOSTIC DISPLAY MECHANISM VIA REMOTE DESKTOP CONNECTIONS

PRIORITY STATEMENT

The present application hereby claims priority under 35 U.S.C. §119 to European patent application number EP12163090 filed Apr. 4, 2012, the entire contents of which are hereby incorporated herein by reference.

FIELD

At least one embodiment of the present invention generally relates to the fields of medical engineering and information technology and in particular concerns the control of a display mechanism for displaying radiological images from a remote client/server-based application connected via a remote desktop connection to the (remote) display mechanism.

BACKGROUND

In the design of information technology and the implementation of radiological diagnostic environments, it is of particular importance to ensure that the image data to be examined are displayed in sufficient quality in order to enable medical evaluation and to avoid faulty diagnoses and incorrect assessments in that, for example, important features of the images cannot be overlooked. To this end, it is, on the one hand, necessary to use selected hardware in order to meet the requirements for the field of medical engineering. On the other hand, it is necessary to adapt the software system to the display requirements.

In particular in clinical environments, but also in systems of doctors in private practice, nowadays it is common for the prior art to use client-server systems in order to prepare and/or transmit or suitably process the image data for diagnostic application or display. To this end, client-server-based applications are implemented on local diagnostic workstations, which for the purposes of control and/or data exchange are dependent to a high degree on the available local network conditions. For flexibility of use, it is frequently desirable to install a diagnostic workstation on a remote viewer, which is controlled by the server-based applications. The data exchange between the application (with the diagnostic software or also with the diagnostic hardware) and the respective viewer (with the display mechanism/monitor) takes place via network connections.

To enable desktop clients to be controlled from remote applications (servers), Microsoft has developed a proprietary network protocol in order to offer terminal services. The Remote Desktop Protocol (RDP) is based on TCP-IP (that is on the transport and internet layer of the ISO/OSI layer model). Here, it is provided that a server (usually called a "terminal server") generates screen content, which then has to be displayed on the remote terminal client. And vice versa, user interaction input (e.g. in the form of mouse and/or keyboard input) is transmitted from the terminal client via the RDP protocol to the server. Hence, the client can be administered and controlled remotely and hence also centrally, namely from the server. In addition to displaying screen content, it is also possible to transmit acoustic signals to the client. The more recent operating systems from Microsoft, such as, for example, Windows XP, Windows Server 2003 and Windows Vista, support the RDP service and the ICA protocol (ICA: Independent Computing Architecture, Citrix). However, the RDP service can also be used with other operating systems, for example in Linux environments, FreeBSD and with Mac-based operating systems. However, the RDP protocol produces a poor performance since it is not designed for graphics-intensive, highly interactive applications. Alternatives to this known from the prior art are PC-over-IP connections (e.g. Teradici or XenApp (Citrix)).

However, the high-speed LAN-connections known from the prior art (LAN: Local Area Network, such as, for example, RDP protocols) cannot be implemented on a slower WAN connection (WAN: Wide Area Network). This means in the field of image processing medical engineering, separation of the client and is only possible at the expense of quality or even completely impossible, so that the data exchange has to be executed via a slow WAN.

As a rule, the majority of mechanisms for high-speed data transmission are based on keeping the volume of data to be transmitted as low as possible in order to load the network as little as possible. Here, as a rule, lossy compression algorithms are used or the image data to be transmitted are modified in some other way (e.g. by reducing the frame-rate rate). The consequence of this for the field of image-processing medical engineering is that, after transmission, the image data sometimes can no longer be displayed in the required quality on the viewer. These dynamic, network-based manipulations to the data compromise the diagnostic quality of the data so that it cannot be ensured that the diagnostic data are displayed on the remote viewer with the required image quality.

However, this development restricts the use of distributed systems in the field of the medical engineering.

In a medical environment, it is desirable, in particular for diagnostics, to provide a solution with which a client/server system is also able to check and safeguard the quality of the transmitted data for remotely installed viewers for displaying and manipulating medical image data. In addition, an application on the client/server system should be informed of the quality of the data received on the viewer and be able to react specifically and flexibly thereto.

SUMMARY

At least one embodiment of the present invention is directed to improving a client-server-based infrastructure for medical diagnostic systems with a remotely installed viewer (remote viewer), which improves upon or even overcomes, at least partially, at least one of the drawbacks of the prior art and is directed to providing an improved mechanism, in particular with respect to the quality of the transmitted data.

In particular, a method for the remote control of a viewer by a client-server-based remote-viewer system is disclosed, along with a computer program product.

The following describes the invention with reference to the method. The advantages, features and alternative embodiments can also be transferred to the other claimed subject matter (the system and the product) and vice versa. Here, the functional features and/or the steps are embodied by corresponding hardware modules, which are intended to take over the respective functions. For example, the sending is performed by a sending module. The hardware modules can be integrated in a chip as microprocessor components.

According to one aspect, at least one embodiment of the invention relates to a method for the remote control of a viewer, which is used to display medical images or a sequence of medical images, wherein the viewer is controlled by an application implemented on a remote server or another computer-based instance. The viewer and the server exchange data indirectly via a remote desktop protocol network connection. "Indirectly" because the data exchange between viewer and server is mediated via an agent. The agent exchanges data with the application via a RVIC channel. In addition, the agent also exchanges data with the viewer via the RVIC channel. In addition, a further communication channel is provided between the agent and the viewer. This is implemented via a remote desktop protocol connection (RDP network connection).

In at least one embodiment, the method comprises the following steps:

on the part of the application: generation of a sequence of images to be displayed on the (remote) viewer, generation of an identifier identifying the sequence of images and/or generation of a transmission indicator and sending the sequence of images with the identifier and/or the transmission indicator to the agent;

on the part of the agent: receiving the sequence of images, the identifier and/or the transmission indicator and analysis of the received transmission indicator for the generation of a modified sequence of images in dependence on the transmission indicator;

sending the modified sequence of images with the identifier from the agent to the viewer via the RDP network connection;

additional (in particular parallel) sending of the identifier as a reference parameter (reference identifier) via the RVIC channel to the viewer;

on the part of the viewer: receiving the modified sequence of images with the identifier via the RDP connection and receiving the reference identifier via the RVIC channel and comparing the two received identifiers for conformity;

displaying the sequence of images on the viewer.

BRIEF DESCRIPTION OF THE DRAWINGS

The following describes the invention in more detail with reference to exemplary embodiments and also with reference to the drawings, which show.

DETAILED DESCRIPTION OF THE EXAMPLE EMBODIMENTS

Figure 1:
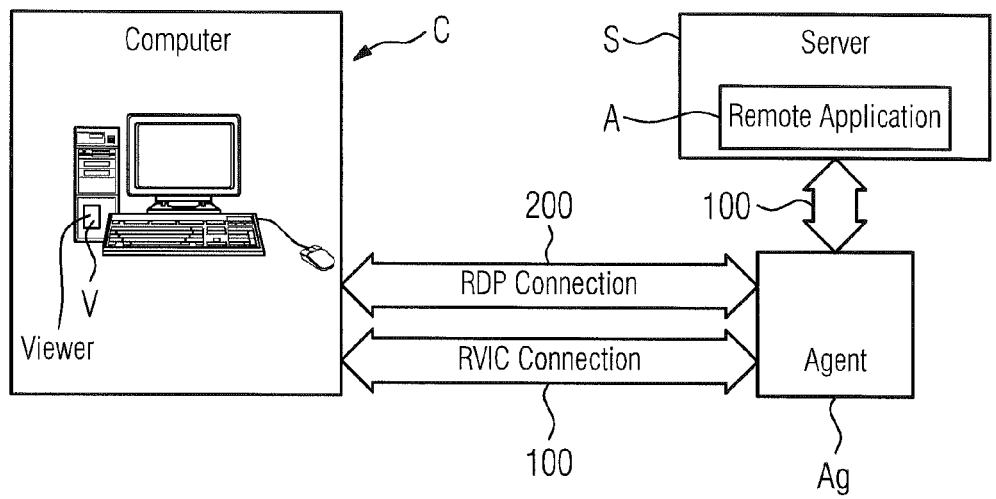
FIG. 1 a schematic depiction of the system according to an example embodiment of the invention, FIG. 2 a more detailed schematic depiction according to an example embodiment of the invention and FIG. 3 a flowchart with reference to an example embodiment.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to one aspect, at least one embodiment of the invention relates to a method for the remote control of a viewer, which is used to display medical images or a sequence of medical images, wherein the viewer is controlled by an application implemented on a remote server or another computer-based instance. The viewer and the server exchange data indirectly via a remote desktop protocol network connection. "Indirectly" because the data exchange between viewer and server is mediated via an agent. The agent exchanges data with the application via a RVIC channel. In addition, the agent also exchanges data with the viewer via the RVIC channel. In addition, a further communication channel is provided between the agent and the viewer. This is implemented via a remote desktop protocol connection (RDP network connection).

In at least one embodiment, the method comprises the following steps:

on the part of the application: generation of a sequence of images to be displayed on the (remote) viewer, generation of an identifier identifying the sequence of images and/or generation of a transmission indicator and sending the sequence of images with the identifier and/or the transmission indicator to the agent;

on the part of the agent: receiving the sequence of images, the identifier and/or the transmission indicator and analysis of the received transmission indicator for the generation of a modified sequence of images in dependence on the transmission indicator;

sending the modified sequence of images with the identifier from the agent to the viewer via the RDP network connection;

additional (in particular parallel) sending of the identifier as a reference parameter (reference identifier) via the RVIC channel to the viewer;

on the part of the viewer: receiving the modified sequence of images with the identifier via the RDP connection and receiving the reference identifier via the RVIC channel and comparing the two received identifiers for conformity;

displaying the sequence of images on the viewer.

The following explains the terminology used for the purposes of this application in more detail.

The viewer is software, which is used to display medical images on a display mechanism (e.g. a monitor). Here, the acquisition modality for the acquisition of the respective images is of subordinate importance. This can entail, for example, computed tomograph scanners, conventional X-ray devices, MRI systems, ultrasound devices, position emission tomograph scanners, etc. It can involve a temporal sequence of images or frames. In some circumstances, it can also involve a video or film sequence (e.g. in the case of ultrasound images). It is also possible to read-in CT and/or MRI images as an image stack or image sequence. Here, it is important for diagnosis that no image from the image stack is skipped. Neither can the sequence of the acquired images be changed, since, in some circumstances, the sequence is relevant for diagnosis. Depending upon the embodiment, this can involve two-dimensional, three-dimensional or higher-dimensional images.

The RDP connection is a remote desktop protocol network connection based on the principles known from the prior art for the operation and control of a remote viewer. In a preferred embodiment, the implementation is based on windows-based technology. However, alternative exemplary embodiments envisage other operating systems.

The agent can be a separate computer provided with suitable software. However, the agent can also be only a software module implemented at the client-server side and expanded according to the invention by the provision of a data transmission/compression function, a quality monitoring function and a confirmation signal monitoring function.

The RVIC channel is a separate communication channel, which is provided additionally for the RDP connection. It is used to maintain the integrity of the data objects to be transferred. According to a first embodiment, the same physical connection is used for the RVIC channel as for the RDP connection. In this case, it is possible to use an additional logical channel in order to transmit the corresponding data records (reference parameters) separately. According to a second aspect, here another physical channel can be used for the data exchange (e.g. mobile radio, UMTS, or other data transmission protocols).

The modified sequence of images, which is generated by the agent in dependence on the received transmission indicator, differs from the (original) sequence of images in temporally variable compression properties of the transmission protocols, which depend upon the available network bandwidth between the viewer and the server. The transmission indicator includes a reference to the quality with which the data record to be transmitted should be transferred to the viewer. If, for example, very high quality has to be provided, it is possible to apply no compression or low compression only (lossless). For other diagnostic tasks, which can be performed with a lower quality (e.g. pure segmentation tasks), the sequence of images can be transmitted compressed.

In principle, the transmission indicator can, therefore, comprise a reference to the quality or to the quality requirements. Here, the transmission indicator can either relate directly to an image in the sequence of images or it can also be related to a plurality images in the sequence of images (e.g. the first 10 images of the image stack).

In an alternative embodiment, it is possible for the transmission indicator to only relate to an image section of an image in the sequence of images and, for example, to indicate that the image content should be transmitted in the highest quality and the icons, menu options, window frames etc. in the respective image in a lower quality, since the latter are only of subordinate relevance for diagnosis. In this way, the transmission indicator indicates whether the respective image is relevant for diagnosis and should be transmitted with high quality. The image content should in principle always be transmitted in high quality since it is relevant for diagnosis, while superficial screen elements, such as, for example, icons, window borders, instruction fields etc. are of lower importance and can, therefore, be displayed in lower quality on the viewer. Further settings can advantageously be configured in advance.

According to an advantageous embodiment, the transmission indicator therefore indicates which compression parameters are to be taken into account during data transmission from the agent to the viewer. Similarly, it is possible to implement quality specifications which in turn exert an influence on the data transmission and/or compression of the sequence of images. The transmission indicator also indicates whether lossy or lossless compression and/or which compression method is to be used for the data transmission.

According to a further aspect, the transmission indicator is determined dynamically and/or in dependence on an available network bandwidth (between the agent and the viewer) and/or in dependence on the current network utilization. This enables the radiological diagnosis on the remote viewer to be highly oriented toward the current requirements of the network in order simultaneously to ensure diagnosis in optimum quality.

According to an example embodiment, in addition to the sequence of images and the transmission indicator, another identifier is transmitted from the application to the agent. The identifier is used to identify the sequence of images. The identifier is transmitted in order to validate the freedom from faults of the data transmitted to the viewer. According to a first embodiment, the identifier identifies the sequence of images as a whole. Alternatively, it is possible for the identifier to comprise a sequence of sub-identifiers, wherein each sub-identifier identifies individual images in the sequence of images. This makes it possible, on the transmission of the identifier to the viewer, to check on the viewer whether the received sequence of images has been transmitted in sufficient quality (e.g. with a sufficient frame rate) in the envisaged sequence and/or within the envisaged period.

To this end, in addition to the identifier, the agent produces a copy of the identifier, which serves as a reference identifier and is transmitted to the viewer via another channel, in particular via the RVIC channel. The viewer then receives the two identifiers—that is the original identifier, which is preferably transmitted together with the sequence of images (e.g. as a data packet) via the RDP connection, and the reference identifier, which is transmitted via the RVIC connection and is therefore able to determine whether the received sequence of images has also arrived in the original and required sequence/quality.

According to an example embodiment of the invention, the identifier can be assigned to the respective sequence of images as a visible or invisible digital watermark. The watermark comprises an in-system unique identification record for the respective current image in the sequence of images which has been selected as relevant for the diagnosis. Alternatively, the identifier can also be embedded in the sequence of images, for example in the metadata (e.g. in a DICOM header data record) or in JPEG attributes.

In an alternative embodiment of the invention, it is possible to transmit only one of the two data records (identifier or transmission indicator) and use it for the adaption of the sequence of images. In another preferred embodiment, the identifier can be merged with the transmission indicator to form one data record. In this case, the data record identifies the sequence of images (or individual images in the sequence of images) and is simultaneously used to define which images in the sequence of images are relevant (and to be transmitted in high quality) and which are not. This is then an identifier-transmission-indicator-data record.

It is essential for a user also to be able to perform user interactions on the viewer within the context of the diagnosis. All usual and known input formats are provided for this. For example, the user can enter inputs with the mouse (move and click), with the keyboard and/or via voice-controlled user guidance. For this, a user interface is installed on the viewer in order to acquire the corresponding signals and transmit them via the RDP connection via the agent to the server or to the control application. When the application has received the signal or the signal sequence representing the user interaction, the application checks whether it is necessary to generate a new display content, that is a new or changed sequence of images. In principle, all user interactions result in a new frame. This means every interaction on the viewer influences the image content to be displayed or the content of the subsequent frames, which have to be generated on the part of the application.

It is essential that it can be ensured according to an example embodiment of the invention that the remote viewer is able independently to identify whether the sequence of images has arrived on the viewer in the quality envisaged by the application and in the envisaged sequence. Preferably, this is done by comparing the original identifier with the reference identifier. In the event of conformity, a confirmation signal can be generated (on the part of the viewer). Optionally, the confirmation signal can be displayed directly on the viewer and/or the confirmation signal can be transmitted to further computer-based instances, for example—mediated by the agent—to the application on the server in order to inform this that the sequence of images generated has also arrived on the viewer without errors. Since in practice, as a rule, high data rates are provided, the confirmation signal results in a display which is as uninterrupted as possible (e.g. green signal). Alternatively, it is possible only to allow a display if the confirmation signal could not be generated (as a warning signal). Here, it is, for example, possible to superimpose warnings in order to inform that an error has occurred or that the quality and transmission properties envisaged by the application could not be observed.

A specific, preconfigurable region can be reserved on the user interface for displaying the confirmation signal and/or warning in which, if required, a corresponding message can then superimposed by the remote viewer.

According to one aspect of an example embodiment of the invention, it is provided that the confirmation signal is transmitted from the viewer via the RVIC channel to the application (mediated via the agent). This enables it to be ensured that another (logical) connection is to be used as the RDP application for the data transmission of the confirmation signal.

In a further development of an example embodiment of the invention, it is provided that the confirmation signal comprises a frame drop data record from which at least one frame drop rate can be calculated. Here, it is provided that the identifier in each case identifies a frame or an image in the image sequence. This means each image in the sequence of images is indicated or referenced and it is possible to check on the viewer whether the received sequence conforms to the envisaged sequence in that the original identifier is compared with the reference identifier for conformity. The reference identifier is a copy of the identifier, which in turn identifies an image in the image sequence and is transmitted via the RVIC channel to the viewer. As soon as a reference identifier has no correspondence in an identifier, the viewer can assume that this is a frame drop and that the corresponding image has been lost due to transmission losses. The application can define in advance which frame drop rate will be accepted as the maximum threshold value for the data transmission. As soon as the data rate received on the viewer drops below the threshold value, a warning signal is output, which, if required, can be forwarded to other instances (e.g. system administrators). In addition, the evaluated signals (frame rate, frame drop rate, confirmation signal, warning etc.) can also be used and/or sorted for the purposes of statistical calculations and evaluations.

A further advantageous embodiment of the invention refers to the fact that all or selected user inputs on the part of the viewer and/or all or selected image sequences and/or identifiers, which are generated on the part of the application, are provided with a time stamp. The evaluation of the time stamps for user input (which in turn cause a change to the screen display) and/or the image sequences enables the application to measure which end-to-end update performance of the system is present or which latencies exist for the execution of screen content changes in order to identify an inadequate performance, for example if ultrasound films have to undergo streaming.

The choice or setting of the transmission indicator and/or of the identifier enables the display of the image data to be diagnosed to be adapted on a remote viewer to the currently available network conditions between the viewer and the controlling application. For example, it is possible to determine two application scenarios:

Direct synchronization between the application and the viewer. Here, usually a high display quality is achieved at the expense of a transmission rate (frame rate).

Automatic recognition of insufficient display quality on the viewer and automatic generation of warning messages on a graphical user interface on the viewer. This has the advantage that the doctor working on the viewer is directly informed that the data he is examining is only available in an insufficient quality. This will give him the opportunity to take further steps (or to wait for a better data transmission).

According to one aspect of an example embodiment of the invention, the transmission indicator relates to a complete image in the sequence of images. This informs the agent which requirement conditions have to be met for the transmission of the respective image (high quality, low quality, high/low compression). In a further development of an example embodiment of the invention, the transmission indicator can have a differentiated embodiment and relate to individual sections of an image in the sequence of images. This makes it possible to differentiate which parts of an image are relevant for diagnosis and which are not. For example, menus, buttons, information windows, the depiction of instruments etc. can be indicated as not relevant to diagnosis (and therefore, highly compressed), while image content in principle has to be transmitted with a sufficient diagnostic quality (lossless compression).

Alternatively, with the above-described embodiment, with which the transmission indicator relates to individual image sections of the image in a sequence of images, it is also possible for the application to predefine certain screen areas in which data relevant to diagnosis have to be displayed (e.g. in a window of a certain size). This range is indicated as relevant and sent to the agent.

Generally, all user input is forwarded to the application where it is evaluated or converted to display new screen content. In this case, the viewer and the agent only communicate the signals from the input devices (such as, for example mouse, keyboard etc.). This gives rise to the advantage that the remote viewer can make an independent decision regarding the received image quality and that the viewer can be completely controlled by the remote application.

According to one aspect of an example embodiment, the modified sequence of images is received and displayed on the viewer. Preferably it is provided that the viewer comprises an additional module (e.g. a decompression unit) in order to decompress again a compressed data stream, which was generated according to the specification of the transmission indicator, as a modified sequence of images and to display the then decompressed content. Hence—depending upon the configuration of the system—the viewer is able to display both the sequence of images and the modified sequence of images on the viewer.

A further solution to the aforementioned task resides in a remote-viewer system, which is controlled via a remote application. In at least one embodiment of this comprises:
  a viewer to display medical image content or image sequences,
  an agent, which mediates the data exchange between the viewer and the application and is implemented in the environment of the server,
  a RDP connection between the viewer and the agent,
  a RVIC channel, which is provided additionally for the RDP connection between the viewer and the agent and via which the agent also interacts with the application,
  an image generator embodied on the server and used to generate the sequence of images to be displayed on the remote viewer and to convert the user signals which were input on the remote viewer. In addition, the image generator is used for the generation of an identifier and/or of a transmission indicator. The image generator sends the sequence of images with the identifier and/or the transmission indicator to the agent;
  a transmission module, which is implemented on the agent and is used to analyze the received transmission indicator in order on this basis to generate a modified sequence of images. The transmission indicator indicates the compression or quality with which the image has to be transmitted in each case;
  a sending module, which is also installed on the agent and is intended to send the modified sequence of images with the identifier to the viewer via the RDP connection and which is also intended to send the identifier via the RVIC channel. The sending of the identifier via the RVIC channel serves to enable the provision of a reference or comparison identifier;
  a receive module, which is installed on the viewer and is used to receive the modified sequence of images on the viewer. The identifier and the reference identifier are also received (via the two different connections) and compared for conformity. In the event of conformity, a confirmation signal signaling success can be generated, which is sent via the RVIC channel and mediated via the agent to the application. It is then possible to display the modified sequence of images (in particular following decompression) on the viewer.

The image generator, transmission module, sending module and receive module are preferably computer-implemented modules, which can be provided, for example, as a software code or as hardware and expand the functions of the application, the agent and the viewer.

At least one example embodiment of the invention in particular expands the agent by the transmission and sending module. Here, an example embodiment of the invention expands the agent by the ability to exchange the information required for the (quality) assurance of the data transmission with the application (which is preferably installed on a client in the client/server environment) (e.g. which regions in the image can be compressed and which cannot and if yes, then with which type of compression, sequence information with reference to the sequence of images, coordinates for the display of the warning indicator by the viewer). In addition, this enables the acknowledgement of the correct display (and hence also correct communication) of the image content on the viewer (by reception of the confirmation signal). This means that the medical applications on the remote client-server system are also able to react correctly and, for example, suspend the generation of the next frame until the respective relevant precursor has been transmitted and displayed correctly.

In addition, at least one embodiment of the invention expands the viewer by a receive module. This means further functions are provided on the viewer, namely in the form of checking with the aid of additional, information communicated by the agent whether the images displayed have been received and can be displayed in the quality required by the application and displaying the result of the check (e.g. generation of a warning signal if the compression is too high, frame drop). It is essential that the viewer is able to perform this check completely separately and autonomously (i.e. independently of the application).

The additional signaling between the viewer and the agent required for this is implemented according to at least one embodiment of the invention via an additional information channel RVIC, which can also be logically embedded in the existing remote desktop connection.

According to one aspect, the application is embodied as a client-server application. According to this, the image generator can be embodied as a client of the server.

A further solution of at least one embodiment relates to a computer program product. Alternatively, it is also possible to provide a computer program in at least one embodiment, which can also be stored on a portable storage medium. In this case, the computer program can be implemented in distributed form so that it can be implemented partially on the viewer and/or partially on the server (application and/or agent).

The following describes an embodiment of the invention in more detail with reference to FIG. 1. The left side of FIG. 1 shows a computer C on which a viewer V is implemented. The computer can be embodied as a diagnostic workstation and comprise one or a plurality of monitor(s), a keyboard, a mouse and a computer. Alternatively, it also possible for a computer network or only a display mechanism (monitor) with a UI interface (e.g. mouse and/or keyboard) to be provided. The viewer V is controlled by a remote application A, which is installed on a server S, which is shown on the right-hand side of FIG. 1. The server S does not interact directly with the viewer V or with the computer C, but via an agent Ag. Here, the agent Ag exchanges data exchange with the server S via a RVIC connection 100. In addition, the agent Ag exchanges data with the viewer V via two connections: a Remote Desktop Protocol (RDP) network connection 200 and Remote View Integrity Channel (RVIC) connection 100. These can be two physically separate data transmission paths or a common channel, which is split into two logically separated channels.

Figure 2:
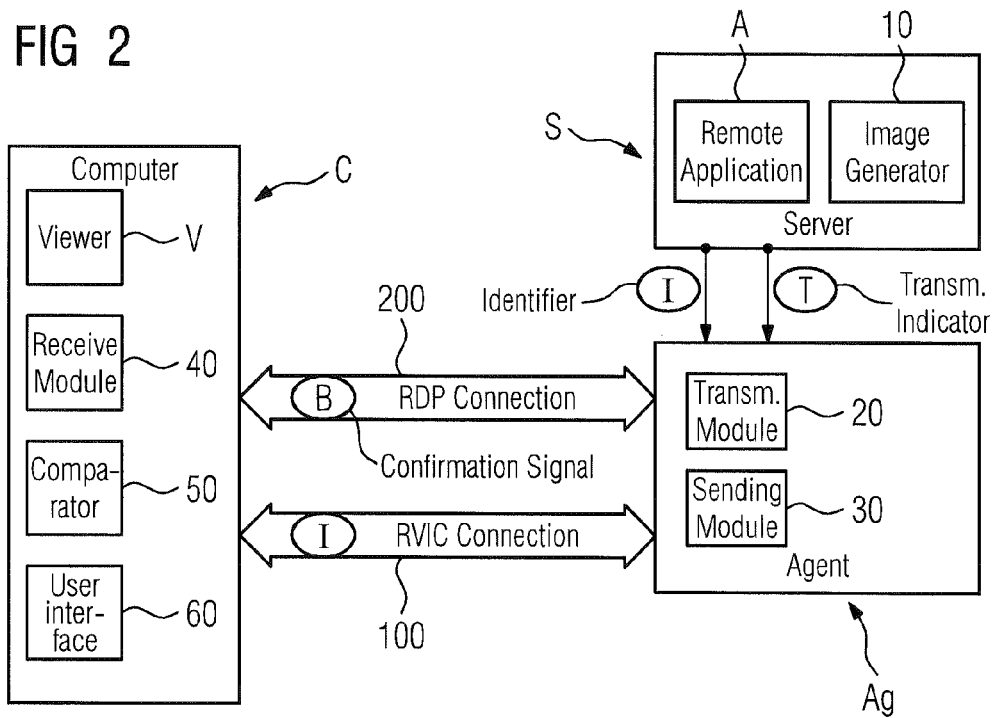

As shown schematically in FIG. 2, in addition to the application A, a client-server system with the server S comprises an image generator 10. The image generator 10 is used to generate a sequence of images, which is to be transmitted to the viewer V for display. In addition, the image generator 10 generates an identifier I, which usually identifies individual images in the sequence of images, and/or a transmission indicator T. In alternative embodiments, the two data records identifier I and transmission indicator T are combined to form one data record.

The agent Ag comprises a transmission module 20 and a sending module 30. The transmission module 20 is used for the analysis of the received transmission indicator T in order to generate, in dependence on the transmission indicator T, a modified sequence of images from the received (original) sequence of images. The modified sequence of images is adapted to the available network utilization and takes into account which image data has to be transmitted in high quality and hence lossless and which data content is of little relevance and hence can also be transmitted lossy. This is indicated by the transmission indicator T, which then generates a modified sequence of images and forwards these to the sending module 30. The sending module is then used to send the modified sequence of images with the identifier I via the RDP connection 200. In addition, the sending module 30 is used to send the identifier I as a reference identifier via the RVIC connection 100 to the viewer V.

According to an example embodiment of the invention, the transmission indicator can be determined dynamically and in particular in dependence on the current network utilization and the available bandwidth for the data transmission (in particular the RDP connection 200), which is then automatically acquired in a preprocessing step and forwarded to the image generator 10.

In addition to the viewer V installed there, the computer C comprises a receive module 40 and a comparator 50. The receive module 40 is used to receive the modified sequence of images with the identifier I and to receive the reference identifier via the separate RVIC channel 100.

The comparator 50 is used for comparing the identifier I with the reference identifier for conformity. In the event of conformity, error-free data transmission of the screen content as required by the application A can be validated. This can be signaled in the form of a confirmation signal B, which is transmitted the via the RDP connection 200 to the agent Ag and communicated by the agent Ag back to the application A in order to signal to the latter that it was possible to receive and display the image or the sequence of images without errors on the viewer V. Usually, a user interface 60 is installed on the computer C, via which the user can enter user input, for example by operating a mouse and/or keyboard. These signals are then forwarded, preferably via the RDP connection 200, to the agent Ag which forwards these signals to the application A. The application A receives the user signals and then initiates the generation of a new sequence of images or of a new image of a sequence of images, which is in turn transmitted to the viewer V with the above-described method.

The following describes a typical sequence in more detail according to a preferred embodiment with reference to FIG. 3.

After the start of the method, the generation of the sequence of images, the generation of the identifier I assigned to the sequence of images and/or of the transmission indicator T takes place in Step 1.

In Step 2, the application A triggers the sending of the sequence of images, of the identifier I and/or of the transmission indicator T.

In Step 3, the data packet is received on the agent Ag in order to analyze the transmission indicator T, which indicates how the sequence of images is to be compressed and/or transmitted. Following this, the agent Ag can generate a modified sequence of images and prepare them for sending to the viewer V.

In Step 4, the modified sequence of images with the identifier I is sent via the RDP connection 200 to the viewer V.

In Step 5, the identifier I is sent as a reference identifier via the RVIC channel 100 to the viewer V.

In Step 6, the modified sequence of images and the identifier I are received on the viewer V via the RDP connection 200.

In Step 7, the reference identifier is received on the viewer V via the RVIC channel 100.

In Step 8, the identifier I is compared with the reference identifier for conformity.

In Step 9, the screen content or the modified sequence of images is displayed by the viewer V on the computer C. Now, if required, a confirmation signal B can be generated to indicate that the sequence of images could be displayed on the viewer V in sufficient quality. This takes place in Step 12.

In Step 13, the confirmation signal B can then be forwarded via the RVIC connection 100 to the agent Ag and then to the application A. Following this, the method can again generate a new sequence of images and start again or refer to Step 1.

Alternatively, after Step 9, Step 10 can also be performed, with which user signals are acquired via the interface 60.

Step 11 is then used to communicate the user input for changing the displayed screen content to the agent Ag via the RDP connection 200. Then, the method can either be ended or applied iteratively.

As indicated in FIG. 3 by the curved brackets, according to a preferred embodiment of the invention, Steps 1 and 2 are performed on the server S, Steps 3 to 5 on the agent Ag and the remaining Steps 6 to 11 on the viewer V.

The method preferably takes place fully automatically, this means without any user interaction on the part of a user. The method can be partially or completely software-based. It is also possible to embed or integrate the method or system as an embedded system in the computer and/or in the server or the medical engineering system and/or in a control computer (e.g. in the context of a central server). The method is used for storing, processing and forwarding processed data (in the form of identifiers, transmission indicators and the confirmation signal) with reference to computer-based technical devices (network) to other instances. The input parameters for the calculation and/or for the data transfer (the network connections, protocols) are generated differently according to the invention and are dependent upon the currently available network parameters (including the remote desktop protocols). In this way, the method also takes into account circumstances of the data processing system in that the data transfer is based on the technical network parameters.

The method is, as a rule, implemented on a computer. Here, it may be the case that certain sections of the method are embodied as a part of a microprocessor solution and hence hard-wired, while other sections of the method are embodied as software. In this case, only individual sections or parts of the method are implemented by software. As a rule, all or selected sections of the method are binary encoded or present in digital form. Here, all or individual sections of the method can be provided as a source code, as a ready-complied code (machine code) or as an interpreted code (e.g. in the interpreter languages Python, PHP, Ruby) or interpreted via interpreters (e.g. Jit compiler). The programming language used for the software (e.g. C++, Java, Perl or PHP etc.) is irrelevant for the performance of the method according to an embodiment of the invention and the other products claimed. It is essential that the software is directly incorporated in the technical device as part of a technical system and where it is used to control a remote desktop viewer. The parts of the method according to an embodiment of the invention implemented as software can be part of a so-called "embedded system" which is embedded in the surrounding medical engineering system and interacts therewith.

Finally, reference is made to the fact that individual modules can also be implemented as software and/or hardware modules and the example embodiments should in principle not be understood to be restrictive with respect to a specific physical implementation of embodiments of the invention. For a person skilled in the relevant art, it is in particular evident that embodiments of the invention can be implemented distributed partially or completely in software and/or hardware and/or on a plurality of physical products— in particular also computer program products.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method to remotely control a server via a viewer associated with a client device, the method comprising:
   receiving, by the server, a user input, the user input being input to the client device and transferred to the server via a Remote Desktop Protocol (RDP) network connection,
   generating, via the server, a sequence of images, an identifier associated with the sequence of images and a transmission indicator, wherein the identifier includes a digital watermark, the transmission indicator indicates whether the sequence of images are transmittable via a lossless or a lossy compression algorithm, and at least one of the user input, the sequence of images and the identifier includes a time stamp;
   sending the sequence of images with the identifier and the transmission indicator from the server to an agent associated with the server such that that sequence of images are sent to the agent prior to modifying the sequence of images based on the transmission indicator;

modifying, via the agent, the sequence of images based on the transmission indicator to generate a modified sequence of images;

sending, via the Remote Desktop Protocol (RDP) network connection, the modified sequence of images with the identifier from the agent to the viewer;

sending, via a Remote View Integrity Channel (RVIC) channel, a reference identifier from the agent to the viewer, the reference identifier being a duplicate copy of the identifier sent to the viewer via a different communication channel from the identifier;

comparing, by the viewer, the identifier with the reference identifier for conformity;

generating, by the viewer, a confirmation signal in an event of conformity, the confirmation signal including a frame-drop data record from which at least one frame-drop rate is calculated; and displaying the sequence of images on the viewer.

2. The method of claim 1, wherein
the viewer includes a user interface configured to acquire user input,
the viewer is configured to transmit the user input to the server, and
the server is configured to generate a new or changed sequence of images based on the user input.

3. The method of claim 1, wherein each transmission indicator for an image in the sequence of images is assigned to a plurality of images in the sequence of images or a section of an image.

4. The method of claim 1, wherein the server is configured to dynamically determine the transmission indicator based on at least one of an available bandwidth and network utilization of a network.

5. The method of claim 1, wherein the identifier includes a sequence of identifiers that identifies each individual image in the sequence of images.

6. The method of claim 1, wherein the comparing automatically recognizes an occurrence of an error on the transmission of the sequence of images from the server to the viewer.

7. The method of claim 1, further comprising:
transmitting a warning signal automatically to other computer-based instances if the sequence of images received by the viewer is incorrect as indicated by the transmission indicator.

8. The method of claim 1, wherein the sending the modified sequence of images sends the modified sequence using one of compression settings and quality specifications indicated by the transmission indicator.

9. The method of claim 8, wherein the transmission indicator indicates whether lossy or lossless compression is to be used.

10. The method of claim 1, wherein
the comparing includes comparing a sequence of identifiers received by the viewer with a sequence of reference identifiers generated by the server for conformity.

11. The method of claim 10, wherein the confirmation signal is transmitted from the viewer via the RVIC channel to the server.

12. A client-server-based remote-viewer system, comprising:
a client device including a first processor and a first memory, the first memory containing instructions, that when executed by the first processor, configure the first processor as a viewer, configured to display at least one sequence of medical images;
a device including at least one second processor and a second memory, the second memory containing instructions, that when executed by the at least one second processor, configure the at least one second processor as,
a server configured to,
receive a user input, the user input being input to the client device and transferred to the server via a Remote Desktop Protocol (RDP) network connection,
generate a sequence of images, an identifier associated with the sequence of images and a transmission indicator, wherein the identifier includes a digital watermark, the transmission indicator indicates whether the sequence of images are transmittable via a lossless or a lossy compression algorithm, and at least one of the user input, the sequence of images and the identifier includes a time stamp, and
send the sequence of images with the identifier and the transmission indicator such that that sequence of images are sent prior to modifying the sequence of images based on the transmission indicator; and
an agent configured to,
modify the sequence of images based on the transmission indicator to generate a modified sequence of images,
send via the Remote Desktop Protocol (RDP) network connection, the modified sequence of images with the identifier to the viewer, and
send, via a RVIC channel, a reference identifier to the viewer, the reference identifier being a duplicate copy of the identifier sent to the viewer via a different communication channel from the identifier, wherein
the viewer is configured to,
compare the identifier with the reference identifier for conformity, and
generate a confirmation signal in an event of conformity, the confirmation signal including a frame-drop data record from which at least one frame-drop rate is calculated.

13. A non-transitory computer readable medium for, when run on a computer device, executing the method of claim 1.

14. A non-transitory computer readable medium for, when run on a computer device, executing the method of claim 10.

* * * * *